United States Patent [19]
Doolittle

[11] Patent Number: 5,181,759
[45] Date of Patent: Jan. 26, 1993

[54] COLLAPSIBLE ARM REST

[75] Inventor: Edson P. Doolittle, Rochester Hills, Mich.

[73] Assignee: General Motors Corporation, Detroit, Mich.

[21] Appl. No.: 838,994

[22] Filed: Feb. 21, 1992

[51] Int. Cl.$^5$ .............................................. B60J 9/00
[52] U.S. Cl. ..................................... 296/153; 297/412
[58] Field of Search ............... 296/153, 146 R, 146 D; 297/412

[56] References Cited

U.S. PATENT DOCUMENTS

| | | | |
|---|---|---|---|
| 2,897,000 | 7/1959 | Hart et al. | 296/153 |
| 2,922,674 | 1/1960 | Hollerbach | 297/412 X |
| 3,387,881 | 6/1968 | Stepanek et al. | 296/153 |
| 4,783,114 | 11/1988 | Welch | 296/153 |
| 5,072,983 | 12/1991 | Muroi et al. | 296/153 X |

Primary Examiner—Charles A. Marmor
Assistant Examiner—Joseph D. Pape
Attorney, Agent, or Firm—Charles E. Leahy

[57] ABSTRACT

A door is comprised of an inner panel and an outer panel and a door trim panel is attached to the door inner panel and has an arm rest structure carried thereon. An arm rest support member has a lower end mounted on the vehicle door inner panel and an upper end spaced laterally inboard from the door panel and underlying the arm rest structure of the door trim panel. A collapsible tether such as a rope or cable acts between the upper end of the arm rest support member and the door inner panel. When the vehicle occupant pulls on the arm rest to close the door, the collapsible tether is tensioned and transmits the load from the arm rest structure to the door. When a force is imposed on the arm rest structure in the laterally outboard direction, the tether collapses to permit lateral movement of the arm rest structure in the outboard direction toward the door inner panel. In the preferred embodiment, the arm rest support member is of sheet metal construction which is stuck from the sheet metal panel forming the door inner panel.

3 Claims, 1 Drawing Sheet

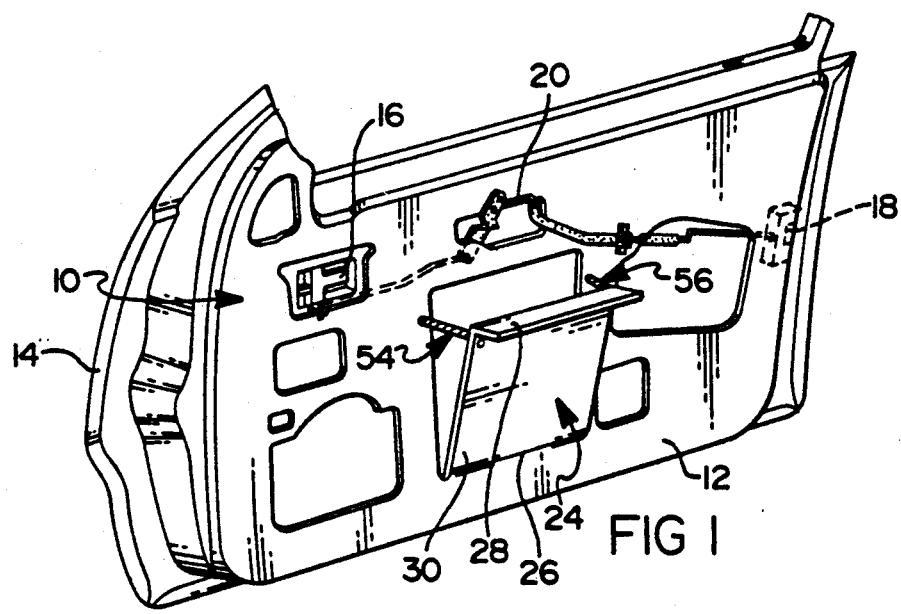
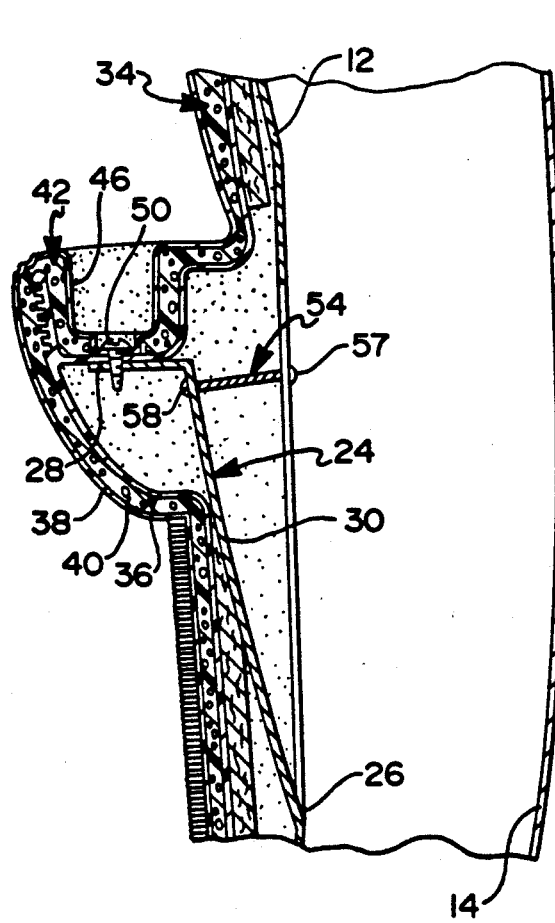
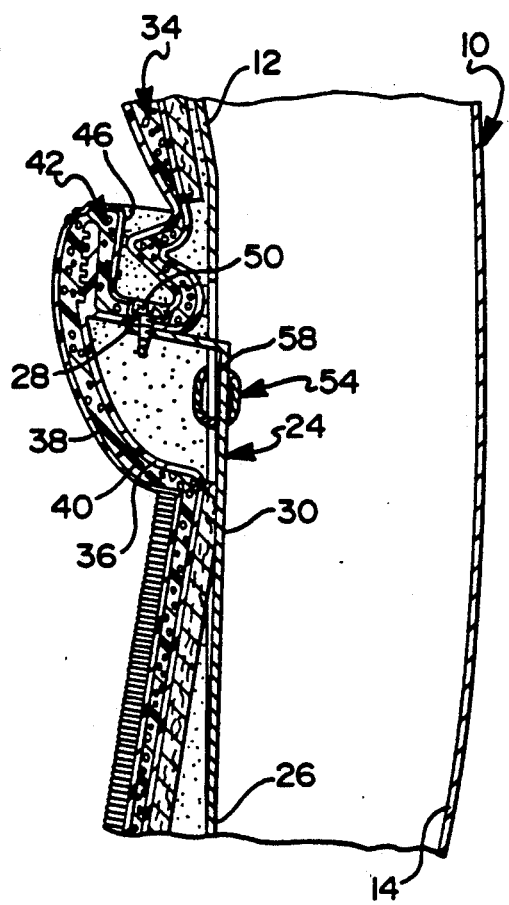

COLLAPSIBLE ARM REST

The invention relates to an arm rest for a vehicle door and more particularly provides an arm rest which collapses laterally into the door under imposition of force against the arm rest in the outboard direction.

BACKGROUND OF THE INVENTION

It is well known to provide arm rest structures for vehicle doors in which the arm rest will collapse laterally in the outboard direction upon imposition of a force against the arm rest.

Examples of such prior art arm rest are U.S. Pat. Nos. 2,922,674 Welch, 3,362,749 Clement, 3,387,881 Stepanek et al, 3,989,275 Finch et al, and 4,783,114 Welch.

SUMMARY OF THE INVENTION

According to the invention, a door is comprised of an inner panel and an outer panel and a door trim panel is attached to the door inner panel and has an arm rest structure carried thereon. An arm rest support member has a lower end mounted on the vehicle door inner panel and an upper end spaced laterally inboard from the door panel and underlying the arm rest structure of the door trim panel. A collapsible tether such as a rope or cable acts between the upper end of the arm rest support member and the door inner panel. When the vehicle occupant pulls on the arm rest to close the door, the collapsible tether is tensioned and transmits the load from the arm rest structure to the door. When a force is imposed on the arm rest structure in the laterally outboard direction, the tether means collapses to permit lateral movement of the arm rest structure in the outboard direction toward the door inner panel. In the preferred embodiment, the arm rest support member is of sheet metal construction which is stuck from the sheet metal panel forming the door inner panel.

DESCRIPTION OF THE DRAWING

These and other features, objects, and advantages of the invention will become apparent upon consideration of the description of the preferred embodiment, and the appended drawings in which:

FIG. 1 is a perspective view of a vehicle door having the door trim panel removed therefrom to show the arm rest support member and collapsible tether of this invention;

FIG. 2 is a section view taken through the door and arm rest and showing the arm rest in its normal use condition; and FIG. 3 is view similar to FIG. 2 but showing the arm rest having moved laterally outboard under the imposition of a force upon the arm rest.

DESCRIPTION OF THE PREFERRED EMBODIMENT

FIG. 1 shows a vehicle door 10 comprised of a door inner panel 12 and a door outer panel 14 which are flanged together around the periphery thereof and are spaced apart to define therebetween the cavity for receiving the window regulator, not shown, as well as other door components. A door handle 16 and a door latch 18 are mounted on the door 10 and connected by a linkage 20. The door is pivotally mounted on the vehicle body by hinges, not shown, so that the door can be pivoted between opened and closed positions.

The door inner panel 12 is of stamped sheet metal construction and includes an arm rest support 24 which is struck from the inner panel 12 and includes an integral living hinge 26 at its lower edge, and a horizontal shelf 28 at its upper edge. As seen in FIGS. 1 and 2, the arm rest support 24 is bent from the inner panel 12 so that the vertical leg 30 and the horizontal shelf 28 project inboard from the plane of the door panel 12 into the occupant compartment.

As seen in FIG. 2, the door inner panel 12 is concealed behind a door trim panel assembly 34. The door trim panel assembly 34 is comprised of a relatively rigid substrate 36 and a layer of vinyl or plastic trim 38 having a layer of foam 40 injected therebetween. An arm rest structure 42 is integrally formed on the door inner panel 12 and includes a hand hole 46 by which the vehicle user grips the door to pull the door closed.

As seen in FIG. 2, the arm rest structure 42 of the door trim panel 34 overlies the horizontal shelf 28 of the armrest support 24 and is preferably attached thereto by one or more screws 50 so that the force applied to the arm rest structure 42 by the occupant is transmitted directly into the arm rest support 24.

Referring to FIGS. 1 and 2, it is seen that the arm rest support 24 is connected to the door inner panel 12 by a pair of collapsible tethers 54 and 56. As best seen in FIG. 2, the tether 54 is a short length of cable, rope, or other flexible element which extends through holes provided respectively in the arm rest support 24 and door inner panel 12. The ends of the collapsible tether 54 carry ferrules 57 and 58 which are swaged thereto. Accordingly, as seen in FIG. 2, the collapsible tether 54 will be in tension normally so that when the occupant grips the arm rest structure 42 via hand hole 46 and pulls the door in the closing direction, the force imposed on the arm rest structure will be transmitted through the screw 50, the horizontal shelf 28, and the collapsible tether 54 into the door inner panel 12.

FIG. 3 shows the outboard lateral movement of the arm rest structure 42 when a force is imposed against the arm rest acting toward the outboard direction. The plastic and foam construction of the door trim panel 34 and the arm rest structure 42 thereof permit the trim panel and arm rest to collapse and bend in the outboard direction. This collapsing motion of the arm rest structure 42 is accommodated by the collapse of the collapsible tether 54 as shown in FIG. 2 so that the arm rest support 24 is permitted to move in the outboard direction into the space between the inner panel 12 and the outer panel 14.

Referring again to FIG. 2, it will be understood that the generally vertical position of the arm rest support 24 permits the arm rest support 24 to act as a column which supports the arm rest structure 42 against any force imposed on the arm rest structure in the downward vertical direction.

Thus it is seen that the invention provides a new and improved arm rest structure for a door which provides substantial support for the arm rest in the vertical and inboard directions, and yet permits collapse of the arm rest structure in the outboard direction. A person of ordinary skill in the art may make modifications to the preferred embodiment shown in the drawings within the scope of the appended claims. For example, the arm rest support member is shown herein as being an integrally stamped construction struck from the door inner panel. However, the support member can be a separately fabricated member which would then be connected to the door inner panel by a suitable hinging arrangement such as would be provided by an interlocking tabs or a hinge pin. It will also be understood that the collapsible tether can be constructed of any suitable mechanism which would transmit force in one direction, but then telescope or collapse upon imposition of force in the opposite direction. For example, the tether could be provided by telescoping tubes or pins which would collapse into one another to permit the collapsing movement of the arm rest.

The embodiments of the invention in which an exclusive property or privilege is claimed are defined as follows:

1. An arm rest construction for a vehicle door comprising:

a door inner panel mounted on the vehicle door;

a door trim panel attached to the door inner panel and having an arm rest carried thereon;

an arm rest support member having a lower end mounted on the door inner panel and an upper end spaced laterally inboard from the door inner panel and underlying the arm rest to support the arm rest;

and collapsible tether means acting between the upper end of the arm rest support member and the door inner panel whereby the tether means effectively connects the arm rest to the door so that pulling on the arm rest closes the door and said tether means collapsing to permit lateral movement of the arm rest toward the door inner panel under imposition of force against the arm rest in the outboard direction.

2. The arm rest construction of Claim 1 further characterized by the door inner panel being a stamped metal panel and having the arm rest support member struck therefrom so that the lower end of the arm rest support member is integral with the inner panel and the upper end is spaced laterally away from the door inner panel.

3. The arm rest construction of claim 2 further characterized by the tether means being a flexible rope-like element having an outboard end attached to the door inner panel and an inboard end attached to the arm rest support member.

* * * * *